Oct. 27, 1964  C. A. JACKSON  3,153,930
TORQUE-MEASURING DEVICE
Filed Aug. 18, 1960  2 Sheets-Sheet 1
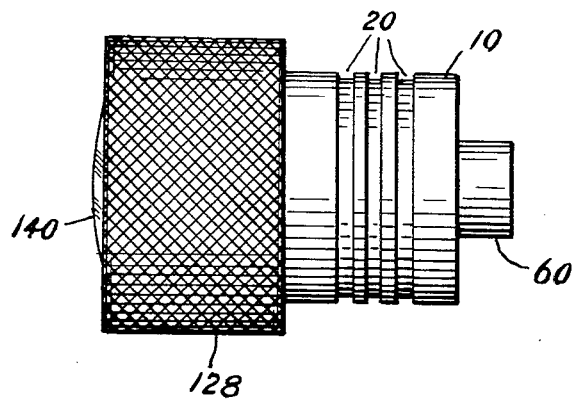
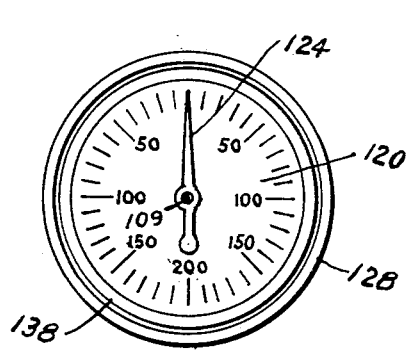
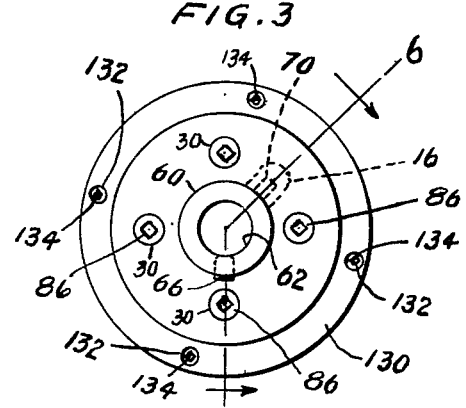
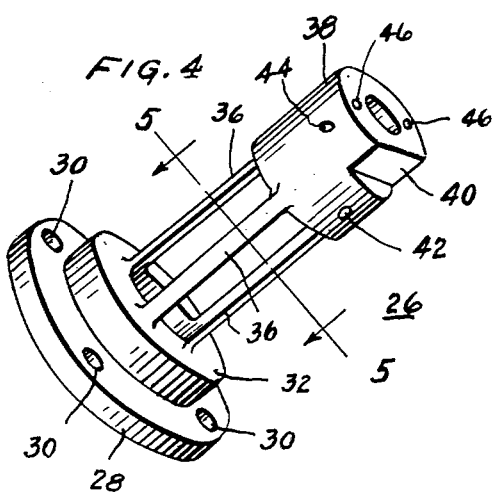
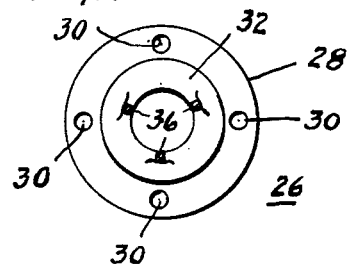
INVENTOR.
CHARLES A. JACKSON
BY  Rey Eilers
ATT'Y.

Oct. 27, 1964  C. A. JACKSON  3,153,930
TORQUE-MEASURING DEVICE
Filed Aug. 18, 1960  2 Sheets-Sheet 2
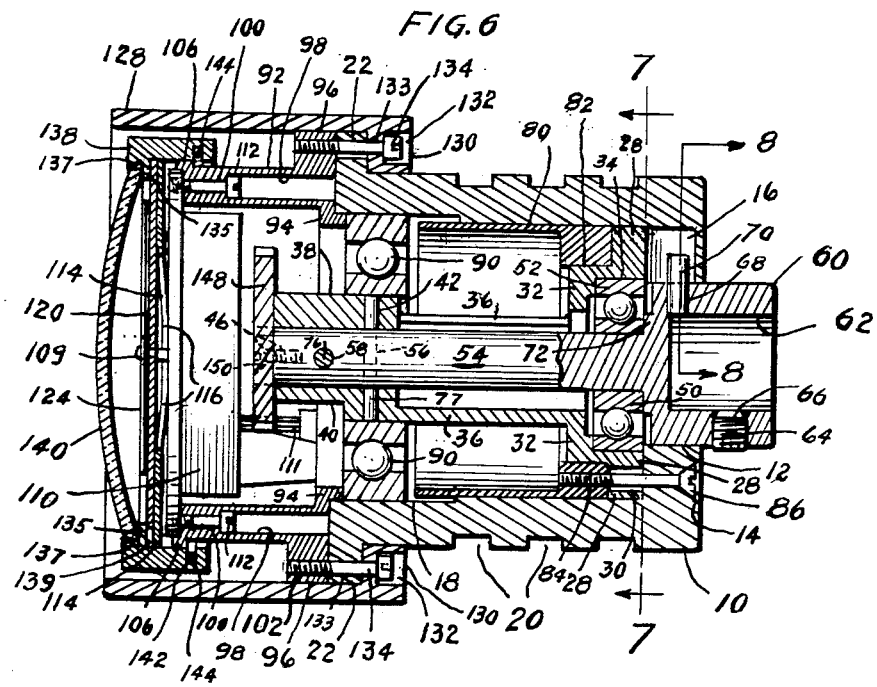
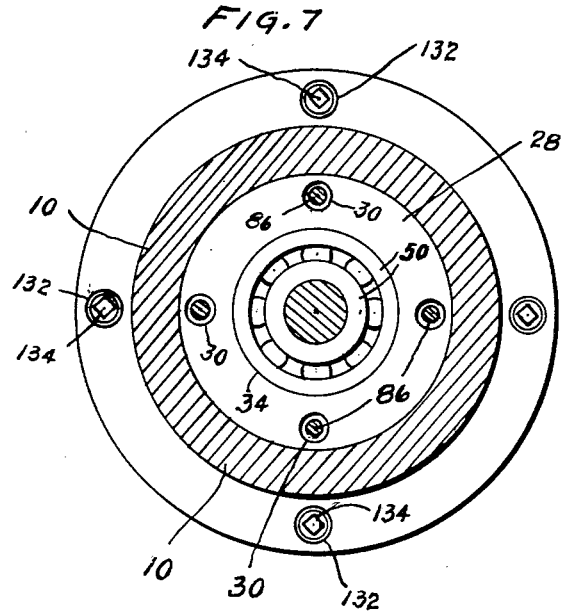
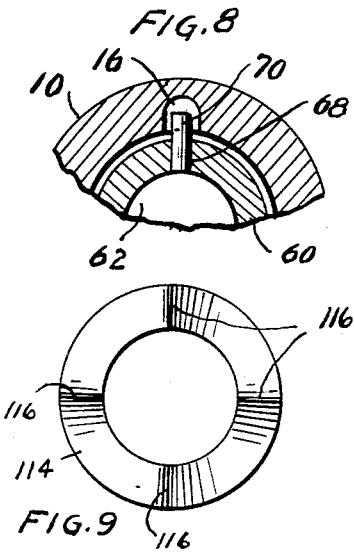
INVENTOR.
CHARLES A. JACKSON
BY Rey Eilers
ATT'Y.

United States Patent Office 3,153,930
Patented Oct. 27, 1964

3,153,930
TORQUE-MEASURING DEVICE
Charles A. Jackson, Florissant, Mo., assignor to Autotronics, Inc., Florissant, Mo., a corporation of Missouri
Filed Aug. 18, 1960, Ser. No. 50,488
9 Claims. (Cl. 73—134)

This invention relates to improvements in torque-measuring devices. More particularly, this invention relates to improvements in devices that can accurately measure relatively small values of torque.

It is frequently desirable to accurately measure values of torque that are quite small. For example, it is frequently desirable to accurately measure values of torque in the range of two to two hundred inch ounces; and it is sometimes desirable to accurately measure values of torque in the range of one to fifteen inch ounces. Torques in those ranges are so small that ordinary torque-measuring devices can not measure them accurately; and hence it would be desirable to provide a torque-measuring device that could accurately measure values of torque below two hundred inch ounces. The present invention provides such a torque-measuring device; and it is therefore an object of the present invention to provide a torque-measuring device that can accurately measure values of torque below two hundred inch ounces.

Some torque-measuring devices must be calibrated frequently to make certain that the measurements which are made with them are accurate. Such torque-measuring devices are objectionable because the calibrating process can be time-consuming and costly. Such torque-measuring devices are additionally objectionable because those devices can provide inaccurate measurements for considerable periods of time until the need for recalibration becomes so obvious that the re-calibrating is done. It would be desirable to provide a torque-measuring device that is permanently calibrated, because such a torque-measuring device would always be able to provide accurate measurements and would always avoid the delays and costs involved in re-calibrations. The present invention provides such a torque-measuring device; and it is therefore an object of the present invention to provide a permanently calibrated torque-measuring device.

Some torque-measuring devices provide one measurement when used in upright position and provide an appreciably different measurement when used in inverted position. Such variations in measurements are objectionable; and it would be desirable to provide a torque-measuring device that supplies substantially the same measurement regardless of its attitude or position. The present invention provides such a torque-measuring device; and it is therefore an object of the present invention to provide a torque-measuring device that supplies substantially the same measurement regardless of its attitude or position.

The torque-measuring device provided by the present invention utilizes a yieldable member that can have one end thereof held against rotation and that can have the other end thereof subjected to the torque to be measured. A dial is normally fixed relative to the said one end of the yieldable member, and a gear train is connected to the said other end of that yieldable member; and that gear train drives a pointer relative to the dial. The normally fixed relation between the dial and the said one end of the yieldable member coacts with the connection of the gear train to the said other end of that yieldable member to provide measurements that are unaffected by the yielding of other parts of the torque-measuring device. For example, any yielding of the input shaft, that connects the said other end of the yieldable member to the torque to be measured, could not enter into and aberrate the indication given by the pointer and dial; because the deflection that is measured is only that between the ends of the yieldable member and is not the deflection between the yieldable member and that end of the input shaft which is connected to the torque to be measured. Further, any "play" between the input shaft and the said other end of the yieldable member could not enter into and aberrate the indication given by the pointer and dial. It is therefore an object of the present invention to connect the input shaft and the gear train of a torque-measuring device to the same end of the yieldable member of that torque-measuring device.

The torque-measuring device provided by the present invention is provided with stops that limit the extent to which the input shaft of that device can be rotated. Those stops are set to keep that input shaft from rotating the other end of the yieldable member so far that the said yieldable member takes a permanent set; and hence those stops make certain that the torque-response of the yieldable member will not be aberrated. Further, those stops keep the pointer from continuing to rotate relative to the dial after the maximum value of the torque-measuring device has been reached, even though additional torque is applied; and thus those stops keep the pointer from giving erroneous values of increased torque.

In some instances it is desirable to pre-set predetermined values of torque on the indicator of a torque-measuring device. For example, where a manufactured unit is to have a predetermined torque, it is desirable to pre-set the value of that torque on the indicator of the torque-measuring device; because the tester of that unit will then be able to determine, with greater rapidity and greater precision, whether that unit has the specified torque. The torque-measuring device provided by the present invention can have values of torque pre-set on it by rotating the zero point of the dial away from the pointer an angular distance corresponding to the pre-set value of torque.

The yieldable member provided by the present invention has a number of spaced, elongated arms which yield in response to the applied torque. Those arms dominantly yield in bending, and yield in torsion to just a limited extent. The resistance of the spaced, elongated arms can be determined more precisely than could the resistance of a sleeve that dominantly yielded in torsion; and hence the torque-response of the yieldable member provided by the present invention can be made quite accurate. It is therefore an object of the present invention to provide a yieldable member which has spaced, elongated arms that dominantly yield in bending.

Other and further objects and advantages of the present invention should become apparent from an examination of the drawing and accompanying description.

In the drawing and accompanying description, a preferred embodiment of the present invention is shown and described but it is to be understood that the drawing and accompanying description are for the purpose of illustration only and do not limit the invention and that the invention will be defined by the appended claims.

In the drawing,

FIG. 1 is a side elevational view of one embodiment of torque-measuring device that is made in accordance with the principles and teachings of the present invention.

FIG. 2 is a view of the front end of the torque-measuring device of FIG. 1,

FIG. 3 is a view of the opposite end of the torque-measuring device of FIG. 1,

FIG. 4 is a perspective view, on a larger scale of the yieldable member of the torque-measuring device of FIG. 1, FIG. 5 is a sectional view, on the scale of FIG. 4, through the yieldable member of the torque-measuring device of FIG. 1, and it is taken along the plane indicated by the line 5—5 in FIG. 4, FIG. 6 is a sectional view, on the scale of FIG. 4, through the torque-measuring device of FIG. 1, and it is taken along the broken plane indicated by the line 6—6 in FIG. 3, FIG. 7 is a sectional view, on the scale of FIG. 4, through the torque-measuring device of FIG. 1, and it is taken along the plane indicated by the line 7—7 in FIG. 6, FIG. 8 is a sectional view, on the scale of FIG. 4, through part of the torque-measuring device of FIG. 1, and it is taken along the plane indicated by the line 8—8 in FIG. 6, and FIG. 9 is a front elevational view of a washer-like spring used in the torque-measuring device of FIG. 1.

Referring to the drawing in detail, the numeral 10 denotes a cup-shaped body for one embodiment of torque-measuring device that is provided by the present invention. An opening 12 is provided at the center of the end wall of the body 10; and countersunk openings 14 are provided in that end wall intermediate the opening 12 and the periphery of the body 10. A recess 16 is formed in the end wall of the body 10, and that recess opens into the hollow center of that body. A precisely-machined surface 18 is provided at the interior of the body 10 adjacent the left-hand end of that body, as that body is viewed in FIG. 6. Three annular grooves 20 are formed in the outer surface of the body 10. An annular flange 22 of small radial dimensions is formed at the left-hand end of the body 10, as that body is viewed in FIG. 6, and that flange projects outwardly beyond the periphery of that body.

The numeral 26 generally denotes a yieldable member that is provided for the torque-measuring device of FIG. 1. That yieldable member has an annular plate 28 at one end thereof; and openings 30 are provided in that plate. The openings 30 can be set in register with the counter sunk openings 14 in the end wall of the housing 10. In the particular embodiment shown, there are four openings 14 and there are four openings 30. The diameters of the openings 30 are appreciably larger than the diameters of the openings 14, as shown particularly by FIG. 6.

A reduced diameter offset 32 is provided on the yieldable member 26; and that offset abuts and projects to the left from the annular plate 28 in FIG. 6. An annular recess 34 is provided in the yieldable member 26, and that recess is located within the plate 28 and within the offset 32. Elongated arms 36 abut and extend to the left from the offset 32 in FIG. 6; and those arms can yield in bending. Those arms support a sleeve-like portion 38, and that sleeve-like portion has a flat surface 40 formed on one side thereof. An opening 42 is provided in the sleeve-like portion 38, and that opening extends transversely of the axis of the yieldable member 26. A second opening 44 is provided in the sleeve-like portion 38, and that opening also extends transversely of the axis of the yieldable member 26. Further, the axis of the opening 44 is disposed at right angles to the axis of the opening 42. Threaded sockets 46 are provided in the end of the sleeve-like portion 38, and those sockets are parallel to the axis of the yieldable member 26. The yieldable member 26 provided by the present invention has the arms 36 thereof spaced apart equal distances so that yieldable member can provide a balanced resistance to any torque applied thereto. In the referred embodiment of the present invention, three arms 36 are provided for the yieldable member 26.

The yieldable member 26 can be cast or machined but it will preferably be machined. In forming the yieldable member 26, that member can be machined to have the annular plate 28 and the offset 32 and to have a constant-diameter cylindrical portion of which the sleeve-like portion 38 is a part. Thereafter the axial opening through the sleeve-like portion 38 is formed, and then a larger diameter opening is formed in the yieldable member 26. The opening in the sleeve-like portion 38 and the larger diameter opening are coaxial; but the larger diameter opening stops short of the sleeve-like portion 38. Thereafter, the metal between the arms 36 will be suitably removed, as by a milling operation. This milling operation and the turning operation that forms the constant-diameter cylindrical portion and the drilling operation that forms the large diameter opening in the yieldable member 26 are performed with great care; and, as a result, the tolerances of the arms 36 are held within very close limits. The arms 36 are of uniform cross-section throughout their lengths, but they have small fillets adjacent the opposite ends thereof. The arms 36 serve as elongated beams of uniform cross-section, and they can yield in bending.

The numeral 50 denotes an anti-friction bearing, and that bearing is shown as a ball-bearing. The outer race 52 of that bearing is dimensioned to fit snugly within the recess 34 formed in annular plate 28 and in offset 32. The inner race of that bearing snugly telescopes over the elongated shank of an input shaft 54. That shaft has an enlarged end 60 at the right-hand end thereof, and a socket 62 is formed in that enlarged end. A threaded opening 64 is formed in the wall of the enlarged end 60; and that threaded opening accommodates a set screw 66.

The shank of the shaft 54 has a diameter that is just slightly smaller than the inner diameter of the sleeve-like portion 38 of the yieldable member 26; and hence that shank will fit snugly within that sleeve-like portion and will make the left-hand ends of that shaft and yieldable member, as that shaft and member are viewed in FIG. 6, precisely coaxial. The shank of the shaft 54 has a passage 56 through it, adjacent the left-hand end thereof, as that shaft is viewed in FIG. 6, and that passage is disposed at right angles to the axis of that shaft. A second passage 58 is formed through the shank of the shaft 54; and that passage also is disposed at right angles to the axis of that shaft. The passage 58 is set at right angles to the passage 56; and it is intermediate the passage 56 and the left-hand end of the shaft 54, as that shaft is viewed in FIG. 6. The passages 56 and 58 in the shaft 54 can be alined with the passages 42 and 44, respectively, of the yieldable member 26. As a result, a roll pin 76 can be telescoped through the openings 44 and the passage 58 and a roll pin 77 can be telescoped through the openings 42 and the passage 56; and those roll pins positively lock the shaft 54 and the sleeve-like portion 38 of the yieldable member 26 against relative rotation. The use of the two roll pins 76 and 77 makes certain that any rotative forces which are applied to the input shaft 54 will be transmitted to the sleeve-like portion 38 of the yieldable member 26.

The enlarged end 60 of the shaft 54 has a socket 68 therein; and that socket accommodates part of a roll pin 70. The rest of that roll pin projects outwardly beyond the periphery of the enlarged end 60 of the shaft 54; and that portion of that roll pin is disposed within the recess 16 in the body 10. The recess 16 is wider than the outer diameter of the roll pin 70, and hence the roll pin 70 can move within the recess 16. This means that the enlarged end 60 of the shaft 54 can rotate a limited number of degrees relative to the body 10. The rotation of the shaft 54 is preferably limited to an overtravel of fifty percent.

An offset 72 is provided on the shaft 54 intermediate the shank of that shaft and the enlarged end 60 of that shaft. The offset 72 receives the right-hand face of the inner race of the anti-friction bearing 50, as that bearing is viewed in FIG. 6, and it spaces the outer race of that bearing from the enlarged end 60 of the shaft 54. In this way, ready rotation of the shaft 54 relative to the outer race of the anti-friction bearing 50 is assured.

The numeral 80 denotes a cup-shaped spacer which has a thick end wall; and the outer diameter of that spacer is just slightly smaller than the inner diameter of the body 10. The thick end wall of the spacer 80 has an opening 82 therein, and the diameter of that opening is just slightly larger than the outer diameter of the offset 32 of the yieldable member 26. The spacer 80 can be telescoped snugly within the body 10, and the opening 82 in the end wall thereof can be telescoped snugly over the outer face of the offset 32 of the yieldable member 26. Threaded openings 84 are provided in the end wall of the spacer 80; and the threaded openings 84 can be set in register with the openings 30 in the annular plate 28 of the yieldable member 26 and with the countersunk openings 14 in the body 10. Whenever the openings 14, 30 and 84 are alined, fasteners 86, shown in the form of machine screws, can be telescoped through the openings 14 and 30 and seated in the threaded openings 84. As indicated particularly by FIG. 6, the diameters of the shanks of the fasteners 86 are materially smaller than the diameters of the openings 30 in the annular plate 28 of the yieldable member 26. This is desirable because it makes it possible to rotate the yieldable member 26 relative to the body 10 prior to the tightening of the fasteners 86. That rotation is used to dispose the roll pin 70, carried by the enlarged end 60 of the input shaft 54, at the approximate center of the recess 16 in the body 10. Such disposition permits the shaft 54 to be rotated in either the clockwise direction or the counter clockwise direction relative to the body 10. Once the roll pin 70 has been set adjacent the center of the recess 16 in the body 10, the fasteners 86 will be tightened to permanently clamp the annular plate 28 of the yieldable member 26 fixedly between the end wall of the body 10 and the end wall of the spacer 80.

The numeral 90 denotes a second anti-friction bearing; and that bearing is shown as a ball bearing. The outer race of that bearing can be pressed into the recess defined by the machined surface 18 at the interior of the body 10. The inner race of that bearing bears upon the sleeve-like portion 38 and will partially extend over the left-hand ends of the arms 36, as those arms are viewed in FIG. 6. However the engagement between the inner race of the anti-friction bearing 90 and the left-hand ends of the arms 36 will not interfere with the bending of those arms.

It will be noted that the inner race of the anti-friction bearing 50 bears directly against the shank of the shaft 54 and that the outer race of that bearing bears directly against the offset 32 and the annular plate 28 of the yieldable member 26. As a result, that bearing coacts with the snug engagement between the left-hand ends of shaft 54 and yieldable member 26, as that shaft and member are viewed in FIG. 6, to keep those members precisely coaxial. Further, it will be noted that the outer race of the bearing 90 holds the left-hand ends of shaft 54 and yieldable member 26, as that shaft and member are viewed in FIG. 6, precisely coaxial with the body 10; and this is desirable because the annular plate 28 and the bearing 50 hold the right-hand ends of that shaft and yieldable member, as that shaft and member are viewed in FIG. 6, precisely coaxial with that body. As a result, the shaft 54 is not only held precisely coaxial with the yieldable member 26, but both of those members are held precisely coaxial with the body 10. Further, the shaft 54 and the yieldable member 26 are fully stabilized against effects due to side loads. This means that there is no possibility of aberrated indications or measurements during the use of the torque-measuring device provided by the present invention.

The numeral 92 denotes a sleeve which has an annular extension 94; and that extension projects inwardly of, and also projects axially beyond, the right-hand end of the sleeve 92, as that sleeve is viewed in FIG. 6. That right-hand end also has an annular flange 96 projecting radially outwardly from it. The axially-extending portion of the annular extension 94 telescopes snugly within the left-hand end of the body 10, as that body is viewed in FIG. 6, and thereby centers the sleeve 92 relative to that body. The right-hand end face of the sleeve 92 and the innermost portions of the right-hand face of the annular projection 96 on that sleeve abut the left-hand end faces of the body 10 and of the annular flange 22 on that body, as that sleeve, projection and body are viewed in FIG. 6. Those end faces are machined carefully so the engagement of those end faces holds the sleeve 92 precisely coaxial with the body 10.

Sockets 98 are provided in the sleeve 92, and openings 100 are provided at the inner ends of those sockets. The diameters of the openings 100 are smaller than the diameters of the sockets 98; and the openings 100 extend from the inner ends of the sockets 98 to the left-hand end face of the sleeve 92, as that sleeve is viewed in FIG. 6. Threaded openings 102 are formed in the annular flange 96 of the sleeve 92; and, in the particular embodiment shown, there are four such openings. These openings are located on two diameters that are set at right angles to each other. The sleeve 92 has a flange 106 which projects radially outwardly beyond the periphery of that sleeve, and also projects axially beyond the left-hand end face of that sleeve, as that sleeve is viewed in FIG. 6.

The numeral 110 denotes a bridge and plate assembly of standard design and construction; and that bridge and plate assembly includes a gear train which has an elongated input pinion 111 and which has an output shaft 109. The gear train intermediate the input pinion 111 and the output shaft 109 greatly multiplies the rotation of the output shaft 109 relative to the rotation of the input pinion 111. An anti-backlash spring, not shown, is provided in the bridge and plate assembly 110, and that spring operates to prevent backlash in both directions of rotation of the input pinion 111. The gear train of the bridge and plate assembly 110 is biased to return the output shaft 109 to a zero position.

The outer periphery of the front plate of the bridge and plate assembly 109 fits within the annular flange 106 on the left-hand end of the sleeve 92, as that sleeve is viewed in FIG. 6. Openings are provided in that front plate; and those openings are threaded to accommodate the threaded shanks of screws 112 which extend through the openings 100 at the inner ends of the sockets 98 in the sleeve 92. Those screws hold the bridge and plate assembly 110 against accidental separation from the sleeve 92.

The numeral 114 denotes a washer-like spring which has radially-extending bends 116 therein. Those bends cause portions of that spring to project forwardly of other portions of that spring and thus provide a spring which is three-dimensional. Those bends can yield to permit the spring 114 to experience flattening. The center of the spring 114 telescopes over the output shaft 109 of the bridge and plate assembly 110, and it abuts the front plate of that bridge and plate assembly.

The numeral 120 denotes the dial provided for the torque-measuring device provided by the present invention. That dial has a central opening which telescopes loosely over the output shaft 109 of the bridge and plate assembly 110; and that dial is provided with suitable markings to indicate the number of inch ounces of torque being measured. The rear face of the dial 120 abuts the washer-like spring 114, and that washer-like spring will urge the dial 120 to the left in FIG. 6.

A pointer 124 has a hub which snugly telescopes over the outer end of the output shaft 109 of the bridge and plate assembly 110. That pointer is disposed forwardly of the face of the dial 120, and it co-acts with the markings on that dial to indicate the inch ounces of torque being measured by the torque-measuring device provided by the present invention.

A sleeve-like cap 128 is provided with an inwardly-extending flange 130 adjacent the right-hand end thereof, as that cap is viewed in FIG. 6. The inner diameter of that cap is just slightly larger than the outer diameter of the annular flange 96 on the sleeve 92; and the inner diameter of the annular flange 130 is just slightly larger than the outer diameter of the body 10. As a result, the cap 128 can be telescoped over the body 10 and can be moved to the left, in FIG. 6, until the flange 130 thereof abuts the flange 22 on that body. A number of sockets 132 are provided in the flange 130 of the cap 128, and those sockets have openings 133 at the inner ends thereof. Those openings can be set in register with the openings 102 in the annular flange 96 of the sleeve 92; and the shanks of fasteners 134, shown as machine screws, can be passed through the openings 133 and seated in the threaded openings 102. Tightening of the fasteners 134 will fixedly clamp the cap 128 and the sleeve 92 to the body 10 and, in effect, make the sleeve 92 and the cap 128 parts of that body. The outer surface of the cap 128 is knurled to facilitate ready gripping and ready holding of the cap.

The numeral 138 denotes a bezel which has a sloping lip 137 at the front thereof and which has an inwardly-directed flange 135. The flange 135 is spaced rearwardly of the sloping lip 137, as shown by FIG. 6. The sloping lip 137 defines an annular space that can accommodate the edge of a crystal 140. A projection or boss 139 is formed on the flange 135 at the rear face of that flange. That projection accommodates a notch in the periphery of the dial 120; and it serves to lock that dial and the bezel 138 for conjoint rotation. The front face of the outer portions of the dial 120 abuts the rear face of the flange 135 and is resiliently held against that rear face by the washer-like spring 114.

The numeral 142 denotes a groove at the interior of the bezel 138 adjacent the right-hand end of that bezel. The groove will be disposed to the right of the annular flange 106 on the sleeve 92, as that sleeve is viewed in FIG. 6, whenever the bezel 138 is assembled with that sleeve. A spring 144 is disposed partially within the groove 142; and that spring has inwardly-extending portions that project inwardly beyond the inner diameter of the bezel 138 and that underlie the rear face of the annular flange 106 on the sleeve 92. In this way, that spring prevents accidental separation of the bezel 138 from the sleeve 92.

Whenever the bezel 138 is in position, the washer-like spring 114 will press the dial 120 against the flange 135; and the projection 139 will be lodged within the notch in the periphery of dial 120. This is desirable because it facilitates ready rotation of the dial 120 to place the zero point thereof in register with the pointer 122 or to place some other point on that dial in register with that pointer and thereby pre-set a predetermined value of torque on the torque-measuring device. All that need be done to place the dial 120 in proper orientation with the pointer 122 is to press the tips of one's fingers against the crystal 140 or against the bezel 138 and rotate that crystal or that bezel. Such rotation will automatically rotate the dial 120 relative to the pointer 122.

It will be noted that the cap 128 projects axially beyond the left-hand end of the bezel 138, as that bezel is viewed in FIG. 6. This is desirable because it protects that bezel from injury; and it is also desirable because it minimizes the likelihood of accidental rotation of that bezel and hence of dial 120.

The numeral 148 denotes a gear which is formed to mesh with the elongated input pinion 111 of the bridge and plate assembly 110. That gear has two openings therein, and those openings can be set in register with the threaded sockets 46 in the sleeve-like portion 38 of the yieldable member 26. Screws 150 can then be passed through the openings in the gear 148 and seated in the sockets 46 in that sleeve-like portion of the yieldable member 26. When the screws 150 are tightened, they will fixedly hold the gear 148 against rotation relative to the sleeve-like portion 38. As a result, rotation of the sleeve-like portion 38 will provide a concomitant rotation of the gear 148. Such rotation will cause rotation of the input pinion 111 of the bridge and plate assembly 110 and will cause amplified rotation of the pointer 122.

Under normal conditions, the pointer 122 will occupy a predetermined position relative to the sleeve 92 and relative to the cap 128; and the dial 120 will set so its zero point is in register with the end of the pointer. At such time, the roll pin 70, carried by the socket 68 in the enlarged end 60 of the shaft 54 will be adjacent the center of the recess 16 in the body 10. To use the torque-measuring device provided by the present invention, the socket 62 of the enlarged end 60 of the shaft 54 will be telescoped over the end of the shaft of the device whose torque is to be measured. Thereafter, the set screw 66 can be used to lock the enlarged end 60 of the shaft 54 to the shaft of that device. The shaft of the device whose torque is to be measured can be suitably urged to rotate, and the knurled cap 128 can be suitably held. The attempted rotation of the shaft of the device, whose torque is to be measured, will cause the input shaft 54 to attempt to rotate; and the attempted rotation of this latter shaft will apply rotative forces to the sleeve-like portion 38 of the yieldable member 26. Those rotative forces will be directly applied to the left-hand end of the yieldable member 26 by the roll pins 76 and 77, and the body 10 will hold the right-hand end of that yieldable member stationary, as that member is viewed in FIG. 6. The arms 36 will tend to yield to the rotative forces; and the extent to which those arms yield will be proportional to the applied torque. As the arms 36 yield, the sleeve-like portion 38 will rotate and will cause the gear 148 secured thereto to rotate. Rotation of the gear 148 will cause rotation of the elongated pinion 111 of the plate and bridge assembly 110; and that rotation will cause amplified rotation of the pointer 122.

The arms 36 will yield partly in bending and partly in torsion; but they will yield predictably, and they will provide linear response to the torque applied to them. The markings on the dial 120 will coact with the pointer 122 to suitably indicate the inch ounces of torque applied by the shaft of the device whose torque is being measured.

It will be noted that the input shaft 54 applies the rotative forces to the same end of the yieldable member 26 to which the gear train of the bridge and plate assembly 110 is connected. This means that if there is any yielding along the length of the shaft 54, that yielding cannot aberrate the readings or the measurements provided by the torque-measuring device of the present invention. Further, it means that if there is any play or looseness between the roll pins 76 and 77 and either the shaft 54 or the sleeve-like portion 38, that play or looseness cannot aberrate the readings or the measurements provided by the torque-measuring device of the present invention. The overall result is that the torque-measuring device provided by the present invention can provide an extremely accurate measurement of the applied torque.

The torque-measuring device provided by the present invention can be made small enough to measure torques in the range of from one to fifteen inch ounces. It would be impractical to try to use a continuous sleeve as the yieldable member for a torque-measuring device intended to measure torque values within such a low range. Such a sleeve would have to be extremely thin; and manufacturing tolerances of a thousandth of an inch could materially vary the torque-resistance of such a sleeve. Such variations could prevent accurate measurements of torque; and hence would make such a torque-measuring device unsatisfactory. With the yieldable member 26 provided by the present invention, however, it is possible to make the arms 36 materially thicker than the thickness of a continuous sleeve. Consequently, manufacturing tolerances can be rendered incapable of materially affecting the accuracy of measurements made with the torque-measuring device provided by the present invention.

The torque-measuring device provided by the present invention does not need recurrent calibrations. Once the annular plate 28 of the yieldable member 26 has been properly locked in position, no further adjustment is needed in the position of that yieldable member. The torque-measuring device provided by the present invention is rugged because there are no parts that are delicate enough to become unbalanced or distorted by the dropping of the torque-measuring device. Further, the sides of the recess 16 in body 10 intercept the roll pin 70 long before the input shaft 54 can rotate far enough to cause the arms 36 of the yieldable member 26 to take a permanent set. In the preferred embodiment of the present invention, the roll pin 70 holds rotation of the shaft 54 to less than four degrees in either direction from its normal resting position. While the rotation of the shaft 54, and thus of the sleeve-like portion 38 is small, that rotation is amplified sufficiently by the gear train of the bridge and plate assembly 110 to provide the requisite rotation of the pointer 122 relative to the dial 120. The anti-friction bearings 50 and 90 largely eliminate frictional forces as a factor in the operation of the torque-measuring device provided by the present invention. Further, the use of gears 148 and 111 tends to minimize the effect of frictional forces as a factor in the operation of the torque-measuring device provided by the present invention; because the interaction of those gears is that of tangential pitch lines. As a result, the torque-measuring device provided by the present invention provides an unusually high degree of fidelity in measuring relatively small values of torque.

The anti-backlash spring within the bridge and plate assembly 110 will tend to resist rotation of the input pinion 111; and it will thus tend to make the torque-measuring device read "low." However, where the torque-measuring device is intended to measure values of torque in the range of from two to two hundred inch ounces, the effect of the anti-backlash spring will be only about one eighth of one percent and can be ignored. Even where the torque-measuring device is intended to measure values of torque in the range from two to fifty inch ounces, the effect of the anti-backlash spring will be only about one half of one percent and can be ignored. However, where the torque-measuring device is intended to measure values of torque in the range from one to fifteen inch ounces, the effect of the anti-backlash spring will be great enough to be a problem. The present invention solves that problem by making the markings on the dials 120 of such torque-measuring devices non-linear.

The socket 62 of the enlarged end 60 of the shaft 54 can accommodate various attachments as well as the shaft of the device whose torque is to be measured. For example, that socket can accommodate an anti-shaft-marring adapter. Also it can accommodate a split bushing which can grip small shafts of small devices. Further, that socket can accommodate a key chuck adapter. In addition, that socket can accommodate a screw-driver or can accommodate a polygonal pin for driving a polygonal socket.

With the torque-measuring device provided by the present invention, it is possible to measure torque in the clockwise or in the counter clockwise direction with equal facility and accuracy. Further, the readings provided by the torque-measuring device of the present invention will be substantially the same whether that device is used in the upright or inverted position.

In machining the yieldable member provided by the present invention, the outer diameter of the constant-diameter cylindrical portion from which the arms 36 are formed must be machined precisely. Also, the large diameter portion of the yieldable member 26 which defines the inner faces of the arms 36 must be machined precisely. Furthermore, the lengths and the widths of the arms 36 must be machined precisely. For example, that large diameter should have a tolerance no greater than one-thousandth of an inch; and the constant-diameter cylindrical portion should have a tolerance no greater than two ten-thousandths of an inch. The lengths of the arms 36 should have tolerances that do not exceed two thousandths of an inch; and the widths of those arms should have tolerances no greater than five ten-thousandths of an inch. Such tolerances are extremely close, but they are being attained in production; and they assure high fidelity for the torque-measurements provided by the torque-measuring device of the present invention.

In using the torque-measuring device provided by the present invention, the cap 128 can be held stationary while the device whose torque is to be measured is caused to apply rotative forces to the input shaft 54. However, if desired, the cap 128 can be rotated to cause the torque-measuring device to apply rotative forces to the shaft of the device whose torque is to be measured. Also, the torque-measuring device provided by the present invention can be equipped with an adapter and used as a wrench or screw driver; and when so used it will indicate the values of the rotative forces applied to the bolt, nut or screw.

Whereas the drawing and accompanying description have shown and described a preferred embodiment of the present invention, it should be apparent to those skilled in the art that various changes may be made in the form of the invention without affecting the scope thereof.

What I claim is:

1. A torque-measuring device which has a housing, a pointer that is rotatable relative to said housing, a gear train that is connected to said pointer to rotate said pointer, a dial that is adjacent said pointer and that can be rotated relative to said housing, said dial having markings thereon which represent values of torque, an input shaft that can be connected to the device whose torque is to be measured, a yieldable member that has one end thereof connected to said housing to hold said one end thereof coaxial with said housing and to prevent lateral movement or rotation between said one end thereof and said housing, said yieldable member having the other end thereof connected to and telescoped over one end of said input shaft in coaxial relation, a gear that is secured to said other end of said yieldable member and that engages a gear of said gear train, a bearing that is intermediate said input shaft and said one end of said yieldable member and that coacts with the coaxial telescoping of said one end of said yieldable member over said input shaft to hold said yieldable member and said input shaft coaxial and to prevent lateral movement between said input shaft and said one end of said yieldable member, a second bearing that is intermediate said housing and said other end of said yieldable member to prevent lateral movement between said housing and said other end of said yieldable member and that coacts with the connection between said one end of said yieldable member and said housing to hold said yieldable member coaxial with said housing and thereby also hold said input shaft coaxial with said housing, and a stop member that is carried by said input shaft and that is disposed between two adjacent surfaces on said housing and that selectively engages said surfaces to limit the rotation of said input shaft relative to said housing, said yieldable member having a plurality of equally spaced, elongated arms of uniform cross section intermediate said ends thereof that can yield dominantly in bending, said input shaft applying rotative forces to said other end of said yieldable member and said spaced, elongated arms responding to said rotative forces to yield dominantly in bending and thereby permit said other end of said yieldable member to rotate relative to said housing, said rotation of said other end of said yieldable member causing said gear to act through said gear train to rotate said pointer relative to said dial, said stop member and said adjacent surfaces limiting the rotation of said other end of said yieldable member to extents below the extent at which said yieldable member would take a permanent set, said dial being non-linear adjacent the lower end thereof.

2. A torque-measuring device which has a housing, a pointer that is rotatable relative to said housing, a gear train that is connected to said pointer to rotate said pointer, a dial that is adjacent said pointer, said dial having markings thereon which represent values of torque, an input shaft that can be connected to the device whose torque is to be measured, a yieldable member that has one end thereof connected to said housing to prevent lateral movement or rotation between said one end thereof and said housing, said yieldable member having the other end thereof connected to said input shaft, a gear that is secured to said other end of said yieldable member and that engages a gear of said gear train, a bearing that is intermediate said input shaft and said one end of said yieldable member and that coacts with the connection of said other end of said yieldable member to said input shaft to hold said yieldable member and said input shaft coaxial, a second bearing that is intermediate said housing and said other end of said yieldable member to prevent lateral movement between said housing and said other end of said yieldable member, and a stop member that is carried by said input shaft and that is disposed between two adjacent surfaces on said housing and that selectively engages said surfaces to limit the rotation of said input shaft relative to said housing, said yieldable member having plurality of equally spaced, elongated arms of uniform cross section intermediate said ends thereof that can yield dominantly in bending, said input shaft applying rotative forces to said other end of said yieldable member and said spaced, elongated arms responding to said rotative forces to yield dominantly in bending and thereby permit said other end of said yieldable member to rotate relative to said housing, said rotation of said other end of said yieldable member causing said gear to act through said gear train to rotate said pointer relative to said dial, said stop member and said adjacent surfaces limiting the rotation of said other end of said yieldable member to extents below the extent at which said yieldable member would take a permanent set.

3. A torque-measuring device which has a housing, a pointer that is rotatable relative to said housing, a gear train that is connected to said pointer to rotate said pointer, a dial that is adjacent said pointer, said dial having markings thereon which represent values of torque, and input shaft that can be connected to the device whose torque is to be measured, a yieldable member that has one end thereof connected to said housing, said yieldable member having the other end thereof connected to said input shaft, a gear that is secured to said other end of said yieldable member and that engages a gear of said gear train, said gear train enabling a yielding of said yieldable member, which is so slight that said yieldable member experiences no perceptible shortening of the effective length thereof, to provide full deflection of said pointer relative to said dial, and a stop member that is carried by said input shaft and that is disposed between two adjacent surfaces on said housing and that selectively engages said surfaces to limit the rotation of said input shaft relative to said housing, said stop member being remote from said pointer and protecting said pointer from stress, said yieldable member having a plurality of equally spaced, elongated arms of uniform cross section intermediate said ends thereof that can yield dominantly in bending and that will yield progressively and proportionately throughout the values of torque represented by said dial, said input shaft applying rotative forces to said other end of said yieldable member and said spaced, elongated arms responding to said rotative forces to yield dominantly in bending and thereby permit said other end of said yieldable member to rotate relative to said housing, said rotation of said other end of said yieldable member causing said gear to act through said gear train to rotate said pointer relative to said dial, said stop member and said adjacent surfaces limiting the rotation of said other end of said yieldable member to extents below the extent at which said yieldable member would take a permanent set and below the extent at which the yielding of said elongated arms will not be proportional to the applied torque.

4. A torque-measuring device which has a housing, a pointer that is rotatable relative to said housing, a gear train that is connected to said pointer to rotate said pointer, a dial that is adjacent said pointer, an input shaft that can be connected to the device whose torque is to be measured, a yieldable member that has one end thereof connected to said housing, said yieldable member having the other end thereof connected to said input shaft, and a gear that is secured to said other end of said yieldable member and that engages a gear of said gear train, said gear train enabling a yielding of said yieldable member, which is so slight that said yieldable member experiences no perceptible shortening of the effective length thereof, to provide full deflection of said pointer relative to said dial, said yieldable member having a plurality of equally spaced, elongated arms of uniform cross section intermediate said ends thereof that can yield dominantly in bending and that will yield progressively, and proportionately throughout the values of torque represented by said dial, said input shaft applying rotative forces to said other end of said yieldable member and said spaced, elongated arms responding to said rotative forces to yield dominantly in bending and thereby permit said other end of said yieldable member to rotate relative to said housing, said rotation of said other end of said yieldable member causing said gear to act through said gear train to rotate said pointer relative to said dial.

5. A torque-measuring device which has a housing, a pointer that is rotatable relative to said housing, a gear train that is connected to said pointer to rotate said pointer, a dial that is adjacent said pointer, said dial having markings thereon which represent values of torque, an input shaft that can be connected to the device whose torque is to be measured, a yieldable member that has one end thereof connected to said housing, said yieldable member having the other end thereof connected to said input shaft, a gear that is secured to said other end of said yieldable member and that engages a gear of said gear train, a bearing that is intermediate said input shaft and said one end of said yieldable member and that coacts with the connection of said other end of said yieldable member to said input shaft to hold said yieldable member and said input shaft coaxial, and a second bearing that is intermediate said housing and said other end of said yieldable member, said yieldable member having a plurality of equally spaced, elongated arms of uniform cross section intermediate said ends thereof that can yield dominantly in bending, said input shaft applying rotative forces to said other end of said yieldable member and said spaced, elongated arms responding to said rotative forces to yield dominantly in bending and thereby permit said other end of said yieldable member to rotate relative to said housing, said rotation of said other end of said yieldable member causing said gear to act through said gear train to rotate said pointer relative to said dial.

6. A torque-measuring device which has a housing, a pointer that is rotatable relative to said housing, an input shaft that can be connected to the device whose torque is to be measured, a yieldable member that has one end thereof connected to said housing to hold said one end thereof coaxial with said housing and to prevent lateral movement or rotation between said one end thereof and said housing, said yieldable member having the other end thereof connected to and telescoped over one end of said input shaft in coaxial relation, a bearing that is intermediate said input shaft and said one end of said yieldable member and that coacts with the coaxial telescoping of said one end of said yieldable member over said input shaft to hold said yieldable member and said input shaft coaxial and to prevent lateral movement between said input shaft and said one end of said yieldable member, and a second bearing that is intermediate said housing and said other end of said yieldable member to prevent lateral movement between said housing and said other end of said yieldable member and that coacts with the connection between said one end of said yieldable member and said housing to hold said yieldable member coaxial with said housing and thereby also hold said input shaft coaxial with said housing, said other end of said yieldable member being connected to said pointer to rotate said pointer whenever said other end of said yieldable member rotates in response to applied torque.

7. A torque-measuring device which has a housing, a pointer that is rotatable relative to said housing, an input shaft that can be connected to the device whose torque is to be measured, a yieldable member that has one end thereof connected to said housing to prevent lateral movement or rotation between said one end thereof and said housing, said yieldable member having the other end thereof connected to said input shaft, a bearing that is intermediate said input shaft and said one end of said yieldable member and that coacts with the connection of said other end of said yieldable member to said input shaft to prevent lateral movement between said input shaft and said yieldable member, and a second bearing that is intermediate said housing and said other end of said yieldable member to prevent lateral movement between said housing and said other end of said yieldable member, said other end of said yieldable member being connected to said pointer to rotate said pointer whenever said other end of said yieldable member rotates in response to applied torque.

8. A torque-measuring device which has a support, a pointer, a torque-transmitting element, and a yieldable member that has a securing portion adjacent one end thereof secured to and held stationary relative to said support and that has a second securing portion adjacent the other end thereof rotatable in response to applied torque, said yieldable member being generally tubular and said torque-transmitting element being disposed within said yieldable member in telescoped fashion, said second securing portion adjacent said other end of said yieldable member being connected to said pointer and to one end of said torque-transmitting element, the other end of said torque-transmitting element being rotatable relative to said support in response to applied torque and being rotatable to cause said other end of said yieldable member to rotate and thereby rotate said pointer, said yieldable member having a plurality of elongated arms intermediate the ends thereof that can yield dominantly in bending, said elongated arms being of uniform cross section throughout the lengths thereof, said elongated arms being spaced apart, the inner surfaces of said elongated arms being spaced outwardly from the surface of said torque-transmitting element so said arms can yield dominantly in bending without touching said torque-transmitting member.

9. A torque-measuring device which has a support, a pointer, an input shaft that can be connected to the device whose torque is to be measured, and a yieldable member that has one end thereof secured to and held stationary relative to said support, said yieldable member having the other end thereof connected to said input shaft, said other end of said yieldable member being connected to said pointer to rotate said pointer whenever said other end of said yieldable member rotates in response to applied torque, said yieldable member having a plurality of elongated arms intermediate the ends thereof that can yield dominantly in bending, said yieldable member encircling and being coextensive with part of said input shaft, said arms being spaced outwardly from said input shaft so said arms can bend freely relative to said input shaft.

References Cited in the file of this patent
UNITED STATES PATENTS

| 2,256,478 | Hill | Sept. 23, 1941 |
| 2,260,358 | Zimmerman | Oct. 28, 1941 |
| 2,394,022 | Storrie | Feb. 5, 1946 |
| 2,700,896 | Root | Feb. 1, 1955 |
| 2,754,683 | Waugh | July 17, 1956 |
| 2,803,133 | Casady et al. | Aug. 20, 1957 |
| 2,865,200 | Giesler | Dec. 23, 1958 |
| 2,885,884 | Nelson | May 12, 1959 |
| 3,069,903 | Larson | Dec. 25, 1962 |

FOREIGN PATENTS

| 4,669 | Great Britain | Feb. 24, 1911 |